United States Patent [19]

Saunders

[11] Patent Number: 5,295,834
[45] Date of Patent: Mar. 22, 1994

[54] EDUCATIONAL DEVICE EMPLOYING GAME SITUATION

[76] Inventor: Reginald E. Saunders, P.O. Box 1116, Piscataway, N.J. 08854

[21] Appl. No.: 991,415

[22] Filed: Dec. 16, 1992

[51] Int. Cl.⁵ ............................................. G09B 19/22
[52] U.S. Cl. .................................... 434/128; 273/249; 434/245
[58] Field of Search ................... 434/128, 129, 245; 273/249, 243

[56] References Cited

U.S. PATENT DOCUMENTS

| | | | |
|---|---|---|---|
| 4,121,823 | 10/1978 | McBride | 273/243 X |
| 4,201,388 | 5/1980 | Cantelon | 434/245 X |
| 4,932,667 | 6/1990 | Gorski et al. | 273/249 |
| 5,007,650 | 4/1991 | Reed et al. | 273/249 |
| 5,071,134 | 12/1991 | Burroughs, Jr. | 273/249 |

FOREIGN PATENT DOCUMENTS 2229930 10/1990 United Kingdom ................ 273/272

*Primary Examiner*—Gene Mancene
*Assistant Examiner*—Jeffrey A. Smith

[57] ABSTRACT

An educational device employing charades and answer-based question formulation in a game situation to teach subject matter of a particular religious nature is disclosed. The educational device is typically comprised of a playing board having a plurality of contiguous spaces extending in a path parallel to the perimeter and converging on the center thereof. Certain of the contiguous spaces contain indicia which correspond to subject matter area categories and associated subject matter area text entries on the cards of a card deck. Certain of the contiguous spaces correspond to a card deck containing question-answer and player interaction/movement cards. The remaining contiguous spaces specifically direct player movement. The playing board also contains a plurality of non-contiguous spaces located on various portions thereof. A plurality of markers are used by the players and chance means initially directs player movement about the board. Players are awarded or required to relinquish scoring markers based on the completion of particular game tasks and the information contained on selected game cards. The object of the game is to reach the central area of the game board and collect as many scoring markers as possible while traveling through the contiguous and non-contiguous spaces.

9 Claims, 2 Drawing Sheets

EDUCATIONAL DEVICE EMPLOYING GAME SITUATION

FIELD OF THE INVENTION

This invention relates in general to educational devices and more specifically to educational devices employing charades, and question and answer in a game situation to teach various subject matter especially religious subject matter.

BACKGROUND OF THE INVENTION

Various educational devices have been employed throughout the years to teach particular subject matter. These educational devices consist primarily of charts, tables, flash cards and the like. Such prior art devices mainly provide instruction on a single subject matter area. Although these educational devices provide an adequate treatment of the subject matter, they provide little in the form of amusement.

Educational devices employing game situations having religious themes are known in the art. These educational devices utilize a playing board, game pieces and cards, wherein individual players complete with each other by question and answer testing, having as their object the educating of the player in religious subject matter. Typical of such educational games are those disclosed in U.S. Pat. Nos. 4,121,823 (Educational Device Employing a Game Situation) and 4,934,709 (Memory Game Apparatus and Method of Play).

Another known popular game involving competing playing teams is the game of "Trivial Pursuit" disclosed in U.S. Pat. No. 4,682,956. The "Trivial Pursuit" game utilizes a game board, game pieces, and game cards containing multiple inquiries, each requiring a a specific single answer, and the correct answer to the inquiries. The playing board surface includes a circular playing path containing symbols which serve as indicia to the multiple inquiries on the game cards. The playing path symbols represent different specialized fields of knowledge. A playing team member moves it's game piece to a particular position on the playing path based on the roll of a die. The field of knowledge the playing team is to be tested on is determined by the symbol on which the game piece is located after the move is completed. The playing member of the playing team draws a game card and shows the game card to the opposing team for answer verification. The playing member then reads the question aloud to the other members of the playing team. The playing team has a designated period of time to provide the correct answer to the question. If the playing team provides the correct answer, it is awarded a scoring marker. The object of the game is to be the first team to reach the center of the playing board after collecting the required number of scoring markers.

Those educational devices employing question and answer as the sole means of player interaction lack the necessary animation to sustain interest and provide stimulation to reinforce the repeat use of such devices.

Games involving teams competing with each other in which members of each playing team are required to present certain game details to the playing team are well known in the art. One such example of a game of this type is known as "Charades". Accordingly in the game of "Charades", before the actual play begins, familiar sayings, quotes and the like are placed on individual slips of paper which are then folded and collected into a central area. Each playing team, in turn, designates a team presenter. When a particular playing team's turn arrives, the designated presenting player draws one of the folded slips from the central area. The presenting player, according to the rules which restrict audible communication with the other team players, must silently convey to the other members of the playing team the saying, quote or the like contained on the slip.

Another game known in the art which involves competing playing teams is the game "Star Struck" disclosed in U.S. Pat. No. 4,932,667. It includes a playing board containing a star shaped playing path, game pieces and cards. The game "Star Struck" requires the performing player of the playing team to provide an audition which is typical of an audition required from a performing artist in a number of known performing arts fields. Incorporated with the audition requirement is the concept of observation by the remaining members of the playing team to determine specific information from the performance in order to develop multi-part answers to specific team questions. Movement is determined initially by the roll of a die and subsequently by game cards and correct answers to multi-part team questions. The game "Star Struck" is based upon a performing player's use of verbal and acting skills, personal experience, and knowledge to perform an impromptu audition. It also relies on the playing team's general and specific knowledge of the performing arts fields, as well as the playing team member's ability to interpret the performing player's audition performance. The object of game is to be the first team to make a complete circuit around the board clockwise returning to the start position.

These prior art educational devices promote competition amongst the individual players or teams using the devices. No attempt is made by the prior art to promote mutual cooperation amongst the individual players to maximize the learning experience such that the focus is on how the game is played instead of winning or losing.

Finally, the majority of the prior art educational devices provide instruction on a single subject matter area and can not readily be changed to expand the teaching to other subject matter areas thereby limiting the utility of such devices.

SUMMARY OF INVENTION

The present invention provides an educational device employing charades, and question and answer in a game situation to teach various subject matter. In the preferred embodiment, religious subject matter is taught. The educational device is typically comprised of a playing board having a plurality of contiguous spaces extending in a path parallel to the perimeter and converging on the center thereof, a plurality of non-contiguous spaces located on various portions thereof, a plurality of card decks, a plurality of markers, and a chance means which may be sequentially operated.

Contained in certain of the contiguous spaces are indicia corresponding to categories of the subject matter area. Associated with said contiguous spaces is a deck of cards. Each card in said deck bears a subject matter text entry for each of said indicia. Associated with particular contiguous spaces is another deck of cards. Each card in said deck bears an answer and the appropriate question thereof or specifically directs player interaction/movement. The remaining contiguous spaces specifically direct player movement. The non-contiguous spaces serve as holding areas.

The object of the game is to reach the central area of the game board and collect as many scoring marker as possible while traveling through the contiguous and non-contiguous spaces. At each turn, the player initially advances in accordance with a chance device. The chance device directs the player to one of the contiguous spaces. If the contiguous space is associated with one of the categories of the text entry card deck, the player is required to silently convey the text to the other players in a charade manner, and if conveyed successfully, the player is awarded the marker quantity indicated on the card. For the particular contiguous spaces associated with the card deck containing answer-question and interaction/movement type cards, the player proceeds as follows. If an answer-question type card is drawn, the the player is read the answer and required to guess the corresponding question on the card, and if guessed correctly, the player is awarded the marker quantity indicated on the card. If the card drawn is a player interaction/movement type card, the player is required to follow the directions on the card. If the contiguous space is not associated with a card deck. The player is required to follow the directions on the contiguous space. The turn of the player ends after the player's last directive and begins with chance means on the player's next turn. Typically, the text entry cards and answer-question cards bear religious subject matter, although obviously any subject matter may be employed.

The present invention is based upon a presenting player's use of personal Bible knowledge, life experience, and charade skill to silently convey specific details of the Bible. It also relies on the Bible knowledge, life experience and perceptiveness of the other players to recognize and identify the specific details of the Bible. The present invention is also based upon a player's use of personal Bible knowledge to formulate the appropriate question associated with the answer read aloud to that player.

One advantage of the present invention is that the educational device provides a high level of player animation through the use of aspects of charades in addition to question and answer. The majority of the player interaction occurs away from the game board while each presenting player attempts to silently convey the specific details of the Bible to the other players in the allotted time.

Another advantage of the present invention is that the educational device provides a greater degree of challenge by prohibiting verbal communications and use of props during the player's presentation.

Yet another advantage of the educational device is the additional challenge experienced while trying to determine the appropriate question for a given answer. Unlike the typical game situation where there is only one correct answer to a particular question, in the present invention, there is often more than one question which could correctly correspond to a given answer. The player must guess the accompanying question in the allotted time.

Yet another advantage of the present invention is the random element introduced by the interaction/movement cards in the deck which directs inter-play and marker movement from the primary playing path to the non-contiguous spaces. In certain cases, it affords the player an advantage. In most cases, it provides a penalty as described hereinafter.

Another advantage of the present invention is that it replaces many of the competitive aspects found in prior art with cooperative ones. The players or playing teams are not matched one against the other. Instead, each player is encouraged to do their best while trying to help and encourage the other players. For example, during a presentation, once the other players recognize and identify the specific detail of the Bible being presented, the presenting player receives a scoring marker. However, the presenting player must in turn make a significant statement about the specific detail of the Bible which extends beyond the detail itself so that the other players may learn from it. There are also opportunities for a player to give their turn to another player which is in need.

Yet another advantage of the educational device given the foregoing is that during the presentations, all players participate instead of having one or more players idle while a particular player or team takes their turn.

Another advantage of the present invention is that a player has the opportunity to earn a scoring marker after an unsuccessful answer-question turn if they possess a certain playing card and can correctly formulate the question the other player missed as describe herein.

Yet another advantage of the present invention is that it provides a game apparatus for teaching religious doctrine.

Other and further advantages of the present invention will become apparent from the course of the following detailed description.

DETAILED DESCRIPTION OF THE INVENTION

Figure 1:
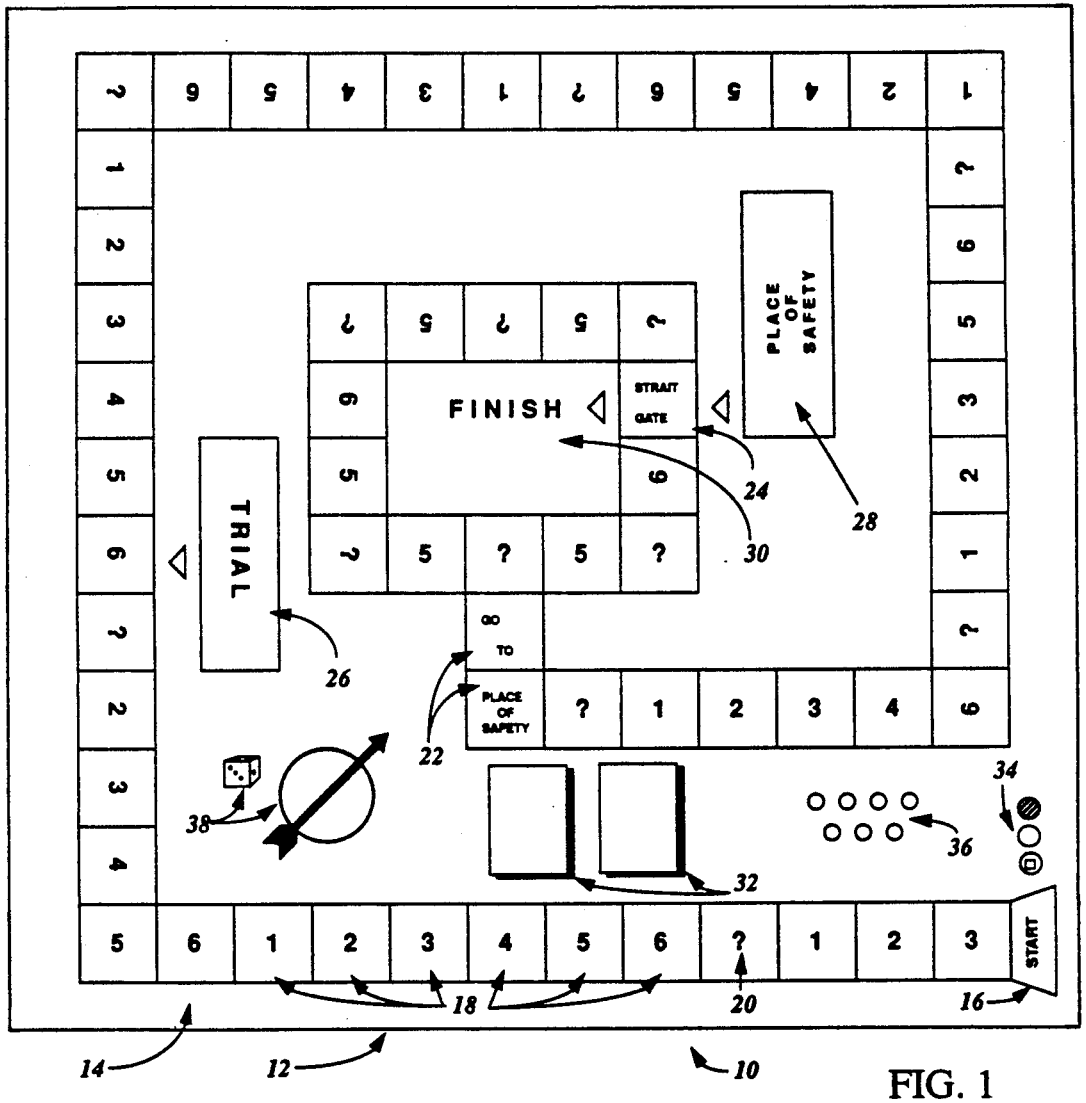
FIG. 1 is a top plan view of a game playing apparatus in accordance with the present invention.

Referring to FIG. 1, there is shown therein a top plan view of a game playing apparatus 10 in accordance with the present invention. The preferred embodiment of the present invention, shown in FIG. 1, is directed to teaching religious subject matter, although it will be apparent in the course of the following description that the invention may readily be adapted for the teaching of different subject matter. The game apparatus 10 is generally comprised of a foldable game board 12 having a plurality of sides and edges, with one of the sides defining a playing surface 14. The game apparatus 10 further comprises a plurality of card decks 32 associated with the contiguous spaces 18 and 20 described hereinafter, markers 34 for each player, various markers such as yellow, green and blue chips 36 as discussed in detail hereinafter and a chance device 38.

The playing surface 14 includes a plurality of contiguous spaces extending in a path parallel to the perimeter and converging on the center thereof and a plurality of non-contiguous spaces located on various portions thereof. Included in the contiguous spaces is a first space 16 which in the embodiment of FIG. 1 is labeled "START". A group of contiguous second spaces, shown generally as 18, contain indicia thereon. These spaces are associated with the categories of the text entry card deck 32. In the preferred embodiment, the subject matter represented by the text entries extracted from the Bible is divided into a plurality of categories, for example, 1—Persons, 2—Places, 3—Things, 4—Groups, 5—Phrases, and 6—Events as better illustrated in FIG. 2. A group of contiguous third spaces, generally shown as 20, in the embodiment of FIG. 1 contain a question mark symbol. These spaces are associated with the answer-question and interaction/movement card deck 32. In the preferred embodiment, the subject matter of a primarily doctrinal nature is represented by the answer-questions extracted from the Bible as better illustrated in FIG. 3. The remaining cards in the deck direct player interaction/movement. Certain of these cards direct the player to the non-contiguous space 26 labeled "TRIAL" in the preferred embodiment of FIG. 1. The remaining contiguous spaces direct player movement. In the preferred embodiment of FIG. 1, contiguous spaces 22 are labeled "GO TO PLACE OF SAFETY" to direct player to the non-contiguous space 28 labeled "PLACE OF SAFETY" Contiguous space 24 labeled "STRAIT GATE" in the embodiment of FIG. 1 serves as an entry point to central area 30 of the game board labeled "FINISH" where play terminates.

Figure 2:
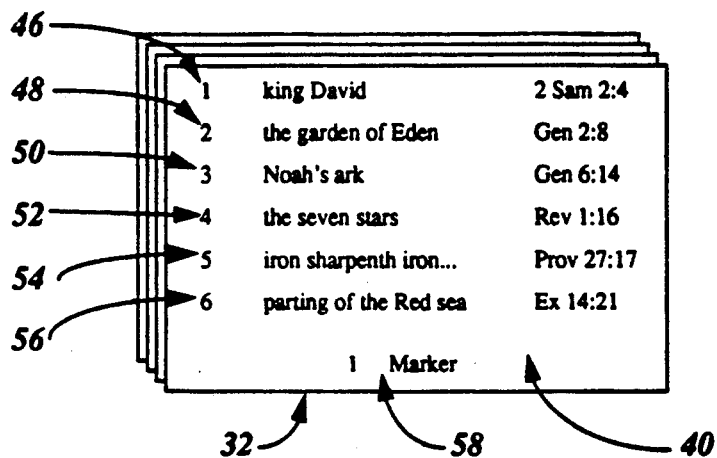
FIG. 2 illustrates a text entry categories card for use with the game playing board of FIG. 1 in accordance with the present invention.

FIG. 2 illustrates the playing side of a text entry card 40 contained in the categories text entry card deck 32. The subject matter extracted from the Bible is divided into a plurality of categories which correspond to the indicia indicative of the predetermined number of subject matter categories defined by the group of second spaces 18 on the playing surface 14 of FIG. 1. In the embodiment of FIG. 2, there are six subject matter categories illustrated, which are: (a) person represented by indicia 46; (b) place represented by indicia 48; (c) thing represented by indicia 50; (d) group represented by indicia 52; (e) phrase represented by indicia 54; and (f) event represented by indicia 56. Also included on the playing side of the text entry categories card 40 is the number of scoring markers 58 to be awarded.

Figure 3:
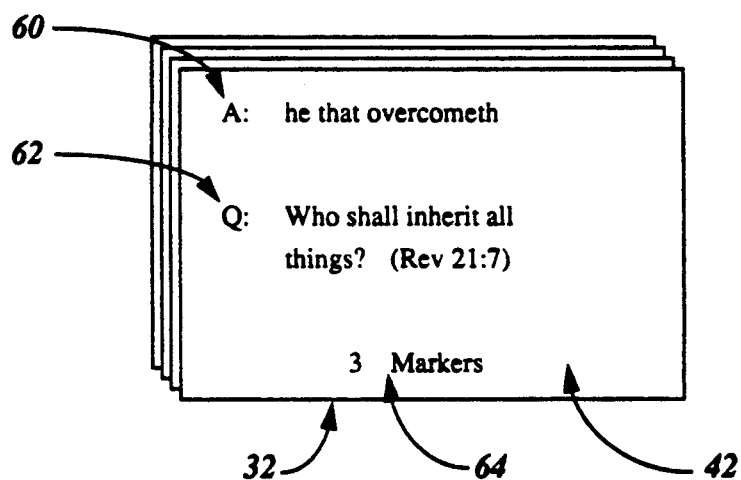
FIG. 3 illustrates an answer-question card for use with the game playing board of FIG. 1 in accordance with the present invention.

FIG. 3 illustrates the playing side of an answer-question card 42 contained in the answer-question and interaction/movement card deck 32. The subject matter extracted from the Bible is presented in the form of an answer 60 and a question 62 corresponding to the answer. Also included on the playing side of the answer-question card is the number of scoring markers 64 to be awarded.

Figure 4:
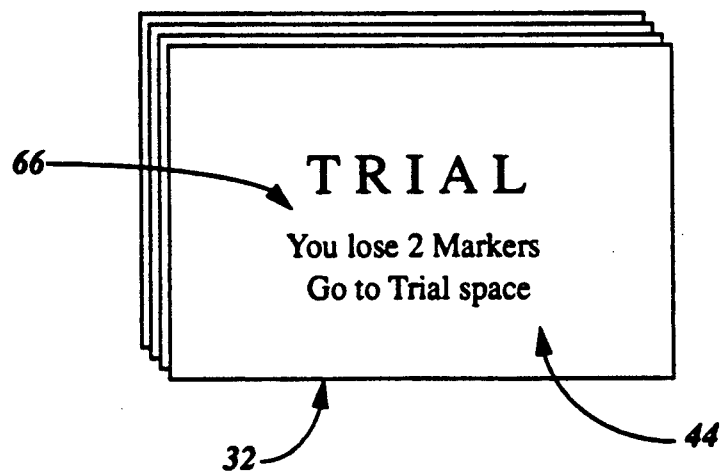
FIG. 4 illustrates an interaction/movement card for use with the game playing board of FIG. 1 in accordance with the present invention.

FIG. 4 illustrates the playing side of an interaction/movement card 44 contained in the answer-question and interaction/movement card deck 32. In the preferred embodiment, an interaction/movement card bears an instruction 66 which specifically directs player interaction or movement, such as, "You may respond in in the PLAYER'S STEAD", "You may GIVE TURN to another player", "ADVANCE to Strait Gate from inner spaces if you gave turn to another player", "TRIAL You lose all but one Marker", and "TRIAL You lose 2 Markers Go to trial box". One such example is shown in FIG. 4.

To begin play, all card decks 32 should be shuffled and placed in position with playing side down. Each player should select a marker 34 and place it in the contiguous first space 16 labeled "START". Each player should take a plurality of scoring markers 36, specifically five yellow markers. The marker color indicates it's score value. Each yellow marker has a score value of one unit. Each green marker is worth five yellow makers (five units) and each blue marker is worth two green markers (ten units). Markers may be exchanged as follows: After accumulating ten yellow markers, five of the yellow markers may be exchanged for a green marker. And, after three green markers have been accumulated, two of the green markers may be exchanged for a blue. The yellow marker is the marker which is awarded during play. Marker exchanges are performed to replenish the quantity of yellow markers in the marker bank.

The order of play may be determined by sequential operation of the chance device 38, such that the starting player is the player obtaining the highest number indicated by the chance device. The play then proceeds clockwise from the starting player. The starting player begins play by operating the chance device 38 to exit the starting space 16. The player moves player marker 34 clockwise the number of spaces indicated by the chance device 38.

If the player lands on one of the second spaces, shown generally as 18 in FIG. 1, the players draws a single card 40, as illustrated in FIG. 2, from the text entry categories card deck 32. The card 40 bears thereon a plurality of text entries, one for each category, together with the number of scoring markers 58 to be awarded. The player silently presents the text entry on the card that corresponds to the space on which the player marker is located. The presented text entry must be identified by the other players in the allotted time which is three minutes in the preferred embodiment. After the text has been guessed and the presenting player has stated a significant fact relating to the text, the presenting player is awarded the number of markers indicated on the card. The card is then place at the bottom of the deck.

If the player lands on one of the third spaces, shown generally as 20 in FIG. 1, the individual to the right of player draws a single card from the answer-question and interaction/movement card deck 32. If an answer-question card 42, as illustrated in FIG. 3, is drawn, the player attempts to guess the corresponding question 62 after being read the answer 60. The card 42 also bear thereon the number of scoring markers 64 to be awarded. In the preferred embodiment, the question must be guessed in the allotted time of three minutes. After the question has been successfully determined, the guessing player is awarded the number of markers indicated on the card. The card is placed at the bottom of the deck. If an interaction/movement card 44, as illustrated in FIG. 4, is drawn, the player proceeds according to the instructions 66 as follows:

A card displaying the words "You may respond in PLAYER'S STEAD" entitles the player to respond after the missed answer-question turn of another player. The card is held until such a situation occurs. The player using the card must: (a) wait until the other player's time has expired, (b) state that they are responding in that player's stead, and (c) attempt to guess the question. Only one guess is allowed. If the player's guess is correct, the scoring marker(s) 64, indicated on card 42 of FIG. 3, are awarded the player giving the response. If neither response is correct, no scoring marker(s) are awarded. The individual reading the answer-question card is not entitled to use a player's stead card in conjunction with that turn.

A card displaying the words "You may GIVE TURN to another player" allows the player to give the current turn to another if so desired. If the player decides to give the turn away, the card is passed to the appropriate player. When the card holder's turn arrives, that player takes two turns. After the second turn, the card is placed at the bottom of the deck. If the player decides not to give the turn away, the card is placed at the bottom of the deck and a second card is drawn by the individual to the right of the player. That card is placed at the bottom of the deck after it has been used.

A card displaying the words "ADVANCE to Strait Gate from inner spaces if you gave turn to another player" entitles the player to move player marker 34 directly to contiguous space 24, labeled "STRAIT GATE", if player marker is currently on one of the contiguous spaces surrounding the central area 30, labeled "FINISH", and player has given away a turn during the course of play. The card is held until such situation occurs. After the card is used, it is placed at the bottom of the deck.

A card displaying the word "TRIAL" requires the player to move player marker 34 from current contiguous third space to non-contiguous space 26, labeled "TRIAL", provided the contiguous third space is not one surrounding the central area 30, labeled "FINISH". The player may also be required to relinquish a certain quantity of scoring markers to the marker bank as indicated on the card. The card is placed at the bottom of the deck.

Once on non-contiguous space 26, labeled "TRIAL", the player is required to successfully convey the text entry of a card selected from the text entry categories deck 32 in order to move player marker 34 to the contiguous second space immediately adjacent to non-contiguous space 26. The number obtained from chance device 38 is used to determine the text entry category rather than the number of spaces to advance during turn. If the text is conveyed in the allotted time of three minutes in the preferred embodiment, the player marker is moved to the adjacent contiguous second space. The player also receives a scoring marker. If the text is not conveyed, the player remains on non-contiguous space 26.

If player marker lands on one of the contiguous spaces 22, labeled "GO TO PLACE OF SAFETY", the player must move player marker to non-contiguous space 28, labeled "PLACE OF SAFETY". During subsequent turns, the player with player marker 34 on space 28 is required to successfully convey the text entry of a card selected from the text entry categories deck 32, in order to move player marker to contiguous space 24, labeled "STRAIT GATE". The number obtained from chance device 38 is used to determine the text entry category rather than the number of spaces to advance during turn. If the text is conveyed in the allotted time of three minutes in the preferred embodiment, the player marker is moved to contiguous space 24, the player is awarded a scoring marker, and the player is allowed an additional turn. If the text is not conveyed, player marker remains on non-contiguous space 28.

If player marker is located on contiguous space 24, labeled "STRAIT GATE", the player is required to successfully convey the text entry of a card selected from the text entry categories deck 32, in order to move player marker to central area 30, labeled "FINISH". The number obtained from chance device 38 is used to determine the text entry category rather than the number of spaces to advance during turn. If the text entry is conveyed in the three minute time requirement of the preferred embodiment, the player marker 34 is moved to central area 30, labeled "FINISH". The player also receives a scoring marker. If the text entry is not conveyed, player marker remains on contiguous space 24.

Upon reaching central area 30, labeled "FINISH", the player obtaining the highest score, based on the quantity of scoring markers possessed, is the winner. Play ends when all player markers 34 reach central area 30 or the remaining player or players with marker(s) outside central area 30 concede.

In the preferred embodiment of FIG. 1, the numerals "1" through "6" are used as indicia to associate the contiguous second spaces, generally shown as 18, with the text entries of the text entry categories card deck 32 as shown in FIG. 2. In other embodiments of the game apparatus 10 of FIG. 1, color coding, icons, or a combination of the two can be used to associate the contiguous second spaces with the text entries of the text entry categories card deck 32.

Having described the invention, it is understood that many variations including those described will be obvious to those skilled in the art without departing from the spirit of the invention herein.

I claim:

1. An educational device comprising
    a game board having thereon a plurality of contiguous spaces certain of which containing indicia corresponding to subject matter area categories and subject matter area text entries on the cards of a first card deck, certain of said contiguous spaces containing a particular means of identification corresponding to a second card deck comprised of cards containing subject matter area answers and associated subject matter area questions, player interaction and player subsequent movement instructions suitable for reinforcing the subject matter of the game, certain of said contiguous spaces specifically directing player movement about the board, and the remaining contiguous space providing an entry point to the game board finish area;
    a plurality of markers;
    a plurality of non-contiguous spaces providing penalty and advantage holding positions for certain of said markers; and
    chance means for directing player movement about the game board.

2. A method for playing an educational game with at least two players or playing teams comprising the steps of:
    providing a game apparatus having thereon a plurality of contiguous spaces certain of which containing indicia corresponding to subject matter area categories and subject matter area text entries on the cards of a first card deck, certain of said contiguous spaces containing a particular means of identification corresponding to a second card deck comprised of cards containing subject matter area answers and associated subject matter area answers and associated subject matter area questions, player interaction and player subsequent movement instructions suitable for reinforcing the subject matter of the game, certain of said contiguous spaces specifically directing player movement about the game apparatus, and the remaining contiguous space providing an entry point to the game apparatus finish area, a plurality of markers, a plurality of non-contiguous spaces providing penalty and advantage holding positions for certain of said markers, and a chance means which may be sequentially operated to direct player movement about the game apparatus;

assigning each player or playing team a player marker;

shuffling the first and second card decks;

determining the order of play by using chance means, beginning play at the player or playing team obtaining the highest indicated number on the chance device and proceeding clockwise;

initially advancing player marker along said contiguous spaces according to the number indicated on the chance device during player's or playing team's turn;

determining deck selection from said first and second card decks, subject matter area category and corresponding subject matter area text entry to be presented, subject matter area answer for which a subject matter area question must be formulated, player interaction, or subsequent player movement based on the contiguous space occupied by the player marker and any information appearing on an associated card selected.

3. The method of claim 2 further comprising the steps of:

providing a situation requiring the player's or playing team member's presentation of said subject matter area text entry to the remaining players in a non-verbal manner without the aid of or reference to devices or objects outside the game.

awarding a presenting player or playing team member a certain quantity of scoring markers based on success-conveyance of said subject matter text entry to the remaining players.

4. The method of claim 3 further comprising the steps of:

providing a situation requiring the player's or playing team member's formulation of the subject matter area question associated with the subject matter area answer contained on said card selected;

awarding a guessing player or guessing team member a certain quantity of scoring markers based on successful formulation of the subject matter area question associated with said subject matter area answer.

5. The method of claim 4 further comprising the step of:

providing a situation allowing another player, other than the player reciting the subject matter area answer from the selected card, to be awarded a certain quantity of scoring markers after an unsuccessful answer-question turn if that player possesses the appropriate card stating such and that player correctly formulates the missed question.

6. The method of claim 5 further comprising the step of:

providing a situation allowing the player, whose turn it is, to give that turn to another player if the appropriate card stating such has been selected for the player.

7. The method of claim 6 further comprising the step of:

providing a situation allowing the player, whose turn it is, to advance to the contiguous space representing the entry point to the game apparatus finish area if the appropriate card stating such has been selected for the player and the requirements on the card have been fulfilled.

8. The method of claim 7 further comprising the step of:

providing a situation requiring the player, whose turn it is, to relinquish a certain quantity of scoring markers and/or move player marker to a penalty non-contiguous space according to the card selected.

9. The method of claim 8 further comprising the step of:

providing a situation requiring the player, whose turn it is, to advance player marker to an advantage non-contiguous space if player marker occupies one of the contiguous spaces directing such movement.

* * * * *